Oct. 27, 1936.     D. KNIES     2,058,804
MATERIAL HANDLING MECHANISM
Filed March 3, 1933     2 Sheets—Sheet 1
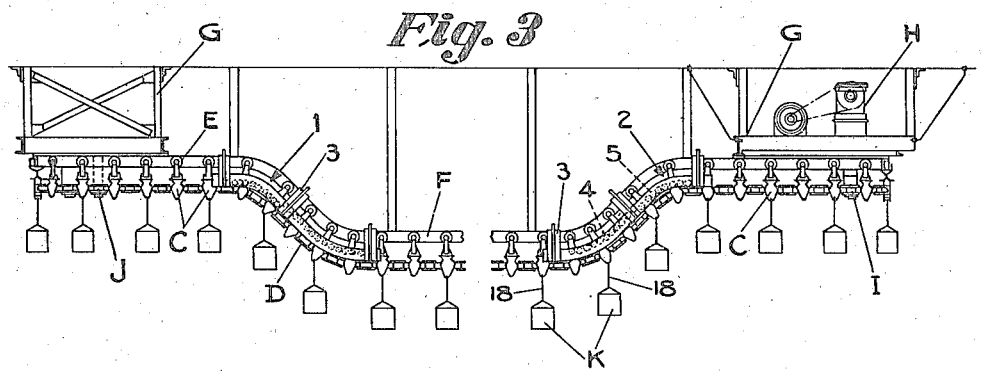
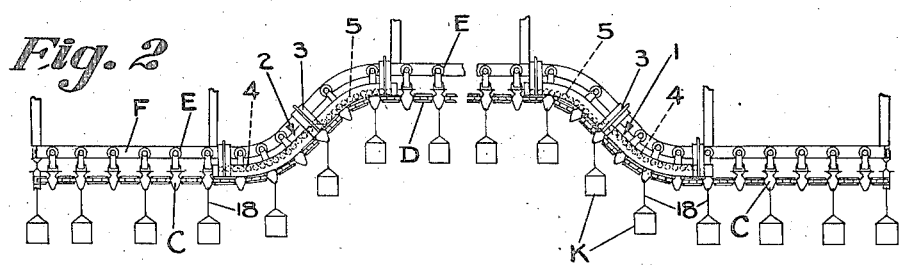
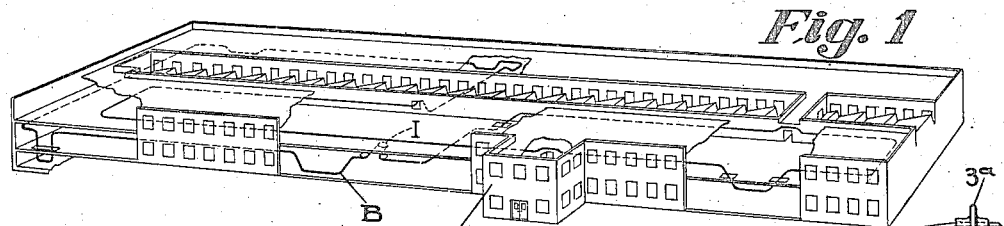
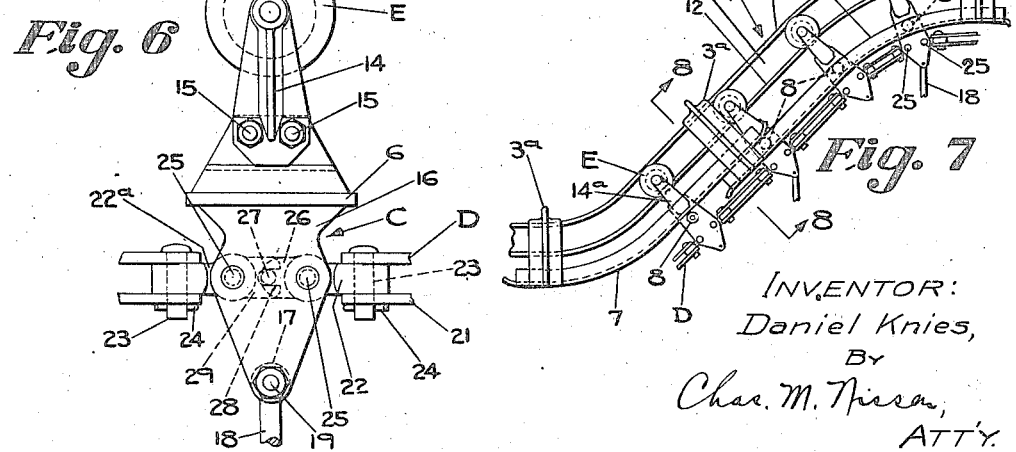
INVENTOR:
Daniel Knies,
By
Chas. M. Nissen,
ATT'Y.

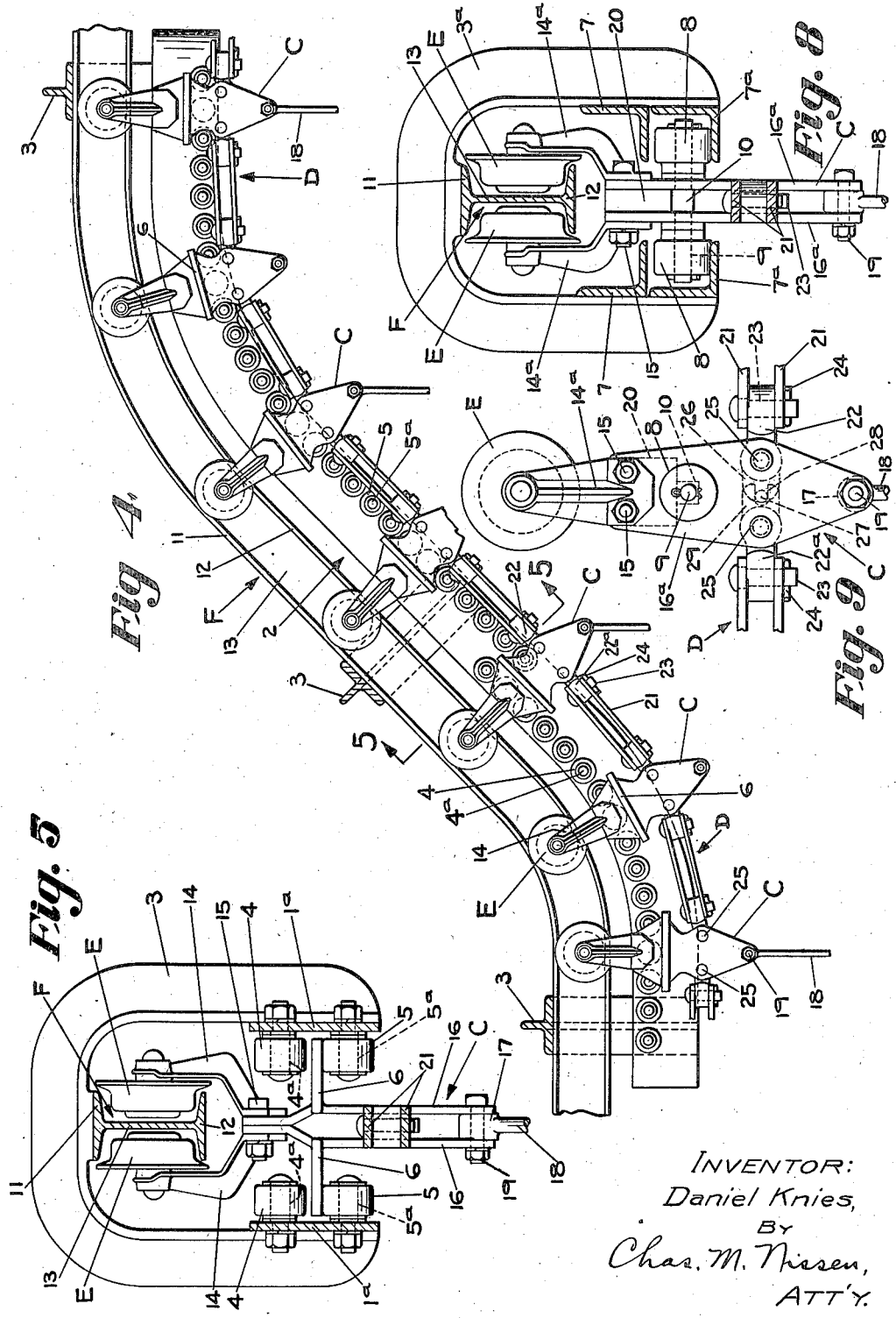

Patented Oct. 27, 1936

2,058,804

UNITED STATES PATENT OFFICE 2,058,804

MATERIAL HANDLING MECHANISM

Daniel Knies, Bexley, Ohio, assignor to The Jeffrey Manufacturing Company, a corporation of Ohio Application March 3, 1933, Serial No. 659,514

31 Claims. (Cl. 104—95)

In material handling mechanisms, such as conveyor systems, especially such systems which involve a long endless conveyor, it is frequently necessary for the installation to have variations in elevation, as for example, as often occurs where the conveyor extends through many parts of a building on various floors and at various elevations.

Where the conveyor is of the so-called trolley type, embracing a track along which the conveyor travels, these changes in elevation tend to apply excessive loads on the usual rollers supporting the conveyor chain from the track. This is due to the fact that at the location of the changes of elevation, the conveyor tends to straighten, thus causing a very substantial increase in the friction between the track and rollers, producing excessive wear on the rollers and sometimes causing breaks to occur in the conveyor system.

In accordance with the present invention, these objections are overcome by the provision of instrumentalities designed to relieve the track and rollers of any excessive load, especially where such changes in elevation occur, thereby eliminating excessive friction and wear on the conveyor, with attendant objectionable consequences.

Generally speaking, such results are obtained by embodying in the conveyor installation, thrust mechanism for relieving the driving pressure between the trolley and the track, the mechanism being associated with those portions of the track where the elevation changes, whereby there is suitably distributed the pulling pressure exerted by the trolley when the driving instrumentalities for the pulley are operated.

In this connection, it is to be borne in mind that where the conveyor travels down from one horizontal plane to another, or up from one horizontal plane to another, the excess pressure on the conveyor is exerted in a downward direction, as is also the case where the conveyor travels up from one horizontal plane to another and then down again; but where the direction of travel is up from one horizontal plane to another, or down from one horizontal plane to another, or where the travel is down from one horizontal plane to another and then up again, the excess pressure on the trolley is in an upward direction. The auxiliary thrust mechanism above referred to must be located relative to the main track with these considerations in view.

The invention will be more readily understood by reference to the accompanying drawings, in which:

Fig. 1 is a diagrammatic view showing, in general, an installation of a long endless conveyor in a building, the conveyor extending through various floors and at various elevations;

Fig. 2 is a diagrammatic elevational view showing a conveyor installation embracing the features of the present invention, where the change in elevation of the conveyor is up from one horizontal plane to another and then down again;

Fig. 3 is a view similar to Fig. 2, but showing the change in elevation to be first down and then up, the view also indicating corner supports and drive instrumentalities for the conveyor;

Fig. 4 is an enlarged detail view of a portion of the installation of Fig. 2, illustrating in more detail the construction of the various parts;

Fig. 5 is a sectional view on the line 5—5 of Fig. 4, looking in the direction of the arrows;

Fig. 6 is a detail side elevation of one of the hangers shown in Fig. 4;

Fig. 7 is a view similar to Fig. 2, but showing a somewhat modified form of construction;

Fig. 8 is a sectional view taken on the line 8—8 of Fig. 7;

Fig. 9 is a detail side elevation of a form of hanger usable in the type of construction illustrated in Figs. 7 and 8.

Referring more particularly to the drawings, A indicates a building having installed therein a conveyor B, which is an endless type, and which is shown as being installed so as to extend through many parts of the building, and at various elevations.

The conveyor B is made up of a plurality of trolley hangers C, interconnected by pivotally mounted links D, the hangers C being suspended from trolley wheels E travelling along the track F. The track F is suitably suspended or supported, as by the frames G, one of which frames is illustrated as carrying the driving instrumentalities H, which instrumentalities operate a driving sprocket I, engaging the links D. A second corner sprocket is indicated generally at J. From selected hangers are suspended the conveyor buckets or receptacles K.

It will be apparent that where the track F bends to change its elevation, there is a tendency of the conveyor to straighten under the pulling force of the driving instrumentalities. This tendency to straighten very materially increases the pulling pressure exerted on the trolley wheels E at the points where the elevation changes. In Fig. 2, where the change is first up from one horizontal plane and then down again, the excess pressure is exerted in a downward direction; in Fig. 3 where the direction of travel is down from one horizontal plane to another and then up again, the excess pressure is directed upwardly. In any case, this excess pressure causes excessive wear on the trolley wheels E.

The present invention contemplates the distribution of this excess pressure.

Referring in more detail to the elements of the present construction, this distribution of excess pressure is accomplished by the provision of auxiliary thrust mechanism including auxiliary tracks 1 and 2 positioned adjacent the main track F where the latter changes its elevation. The auxiliary tracks run parallel to the main track and are suspended therefrom by carriers 3 rigidly mounted on the track F. These carriers 3 are illustrated as being substantially inverted U-shaped, some of them being inclined and some upright depending upon the location of the carriers relative to the curves of the track.

These auxiliary tracks include spaced-apart walls, such as are indicated at 1a, and are provided with means for distributing the pulling pressure exerted by the trolley, which means include the series of rollers, or equivalent devices, indicated as 4 and 5, mounted on stub-shafts 4a and 5a, suitably bolted to the walls of the track and projecting inwardly therefrom. These rollers are provided wherever the tracks change their elevation and are disposed horizontally in different planes, one of the series terminating substantially as the other begins. For engaging with these rollers, the trolley hangers C are provided with laterally extending flanges or plates 6, which are designed to ride along these rollers, engaging the upper series of rollers where the excess pulling pressure exerted by the trolley is in an upward direction and engaging the lower series of rollers when the excess pressure is in a downward direction, so that the excess pressure on the trolley wheels is continuously relieved during the entire travel of the conveyor at such places where the elevation changes. In this way, this excess pressure is relieved from the trolley wheels E, thereby eliminating excessive wear on the wheels, and, through the provision of rollers for engaging the flanges 6, friction is kept at the lowest possible level.

The construction above described may be modified in various ways, one of which is illustrated in the drawings, Figs. 7, 8 and 9, which show the rollers 4 and 5 and the auxiliary tracks 1 and 2 replaced by angles 7 and 7a, which are welded or otherwise rigidly secured to carriers 3a. These angles are arranged in the same manner as are the rollers previously described. In this modification, the plates 6 are replaced by rollers 8, mounted on shaft 9 which extends through the trolley hanger C and is provided with an enlarged spacer 10.

It will be noted from the drawings that the track F is in the form of an I-beam having top and bottom flanges 11 and 12, the carriers 3 or 3a being welded or otherwise rigidly secured to the top flange 11. The trolley wheels E are disposed in pairs, arranged to run along the bottom flange 12 on each side of the vertical web 13 of the track F. Each trolley wheel is mounted on similarly shaped arms or brackets 14 or 14a offset sufficiently to allow free clearance between the trolley wheel flanges and the track flanges 11 and 12.

These arms are secured in place by bolts 15 passing through suitable alined holes in the arms 14 or 14a, and through registering holes in the plates 16 or 16a, forming the body of the hanger C. These plates 16 or 16a, are shaped to define a suitable space between them for receiving the head 17 of a stem 18 carrying a bucket K. The head 17 is freely pivoted on a bolt 19, which is passed through the plates 16 or 16a, and which suspends the bucket K from its hanger. The plates 16 are provided with oppositely extending flange plates 6, and are securely attached to arms 14 by bolts 15.

The modified form of hanger illustrated in Figs. 8 and 9 is of a slightly different construction from the above, in its details. The brackets 14a are similar to the brackets 14, and carry the trolley wheels in like manner. However, in the illustrated form of the device, the side plates 16a are substantially straight, being held in proper relation by the interposition of a spacer 20 which abuts against the enlarged portion 10 of the shaft 9.

In either form shown, the use of the antifriction thrust mechanism including the roller track members 4 and 5 and carrier flanges 6 engaging therewith, in one form of the device, and the angle track members 7 and rollers 8 of the other modification shown, relieves the trolley wheels of all excess pressure at all points of elevational change in the track, and as will be observed from the drawings, the trolley wheels E may be lifted entirely clear from the track F, the weight of the conveyor and load being thereby entirely shifted to the flanges 6 and rollers 8, respectively, thus obviating likelihood of excessive wear or breakage of the trolley wheels.

The manner of securing the trolley hangers C in position in the conveyor chain will now be briefly described.

The conveyor chain D is formed of links 21, disposed in pairs and spaced apart by attachment links 22 and 22a respectively, which extend between the links 21, the latter being secured to the attachment links by a vertical pivot pin 23 and cotter pin 24. The attachment links 22 and 22a are pivotally connected to the carrier plates 16 or 16a by pintles or bolts 25, or equivalent securing members, passed through the plates 16 or 16a, and allowing the links 22 and 22a to swing in a vertical plane.

The attachment links 22 and 22a are adapted to be pivotally interconnected and are formed accordingly with mating ends. Link 22 is provided with an inwardly projecting bifurcated extension 26, in which is fixed a pintle 27 adapted to engage in a notch 28 formed in the projection 29 of the opposite attachment link 22a. These parts are so proportioned and arranged that swinging movement of one of these attachment links about the pintles 25, produces an equal and opposite swinging movement of the companion attachment link. By this relative movement of the links 22 and 22a upon the pintles 25, the chain links 21 extend from the trolley hanger C in substantially equal angular relation thereto at both sides thereof and contributing to the smooth and easy movement of the conveyor.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. In material handling mechanism, the combination with a trolley conveyor comprising oppositely disposed trolley wheels and a traveling chain with a plurality of spaced-apart hangers suspended from the wheels, of a main track for said trolley conveyor, parallel extending guide devices disposed in the same vertical plane below said main track and associated with those portions of said main track which curve upwardly and downwardly when changing elevation, and means on said hangers to engage the said guide devices so as to be supported thereby to tend to lift the trolley wheels from the main track as the latter changes in elevation, thereby relieving excessive friction between the trolley wheels and the track at the said changes in elevation.

2. In material handling mechanism, the combination with a trolley conveyor, of a track therefor having curved portions so formed that the pull on the conveyor tends to increase the pressure on said track, and means separate from said track for resisting thrust of said trolley conveyor toward the centers of said curved portions and thereby relieving the pressure on said track caused by said trolley conveyor when the latter is being pulled along said track.

3. In material handling mechanism, the combination with a trolley conveyor comprising an operating chain with spaced hangers thereon and trolley wheels at the upper ends of said hangers, of a track comprising an I-beam between the flanges of which on opposite sides the said wheels are adapted to travel, guides parallel to curved portions of said I-beam and spaced therefrom, and means projecting laterally from said hangers in position to engage said guides and to be supported thereby to tend to lift the trolley wheels from their track for relieving excess pressure between the wheels and track as the track curves in vertical planes.

4. In material handling mechanism, the combination with a trolley conveyor comprising an operating chain with hangers connected thereto in spaced relation to each other and a pair of spaced trolley wheels connected to the upper end of each hanger, of an I-beam to form a track for said wheels, means for supporting said track with curved portions lying in vertical planes and with some centers of curvature above the track and other centers of curvature of said track below the latter, auxiliary tracks parallel to and spaced from said curved portions of said I-beam, and laterally projecting means on said hangers in position to travel below the auxiliary tracks having a center of curvature above the same and to travel above the auxiliary tracks having a center of curvature below the same.

5. In material handling mechanism, the combination with a trolley conveyor, of a long track therefor having U-shaped portions some upright and some inverted, and means associated with said U-shaped portions to relieve the pulling pressure of said trolley conveyor on said track at such U-shaped portions as the conveyor is operated.

6. Material handling mechanism comprising the combination with a trolley conveyor, of a track therefor adapted to extend through many parts of a building on various floors and at various elevations, guide means associated with the track and disposed in upper and lower parallel planes and parallel with the track for guiding the hangers along the track at the changes in elevation of the track, and means on the hangers engaging first one and then the other guide means as the track changes its direction when passing from one horizontal plane to another in changing its elevation.

7. Material handling mechanism comprising the combination with a trolley conveyor provided with oppositely disposed trolley wheels, of a track therefor adapted to extend through many parts of a building on various floors and at various elevations, angle guides associated with the track and having one of their flanges disposed in upper and lower parallel planes and parallel with the track for guiding the hangers along the track at the changes in elevation of the track, and rollers on the hangers engaging first one and then the other of the guides as the track changes its direction when passing vertically from one horizontal plane to another in changing its elevation.

8. Material handling mechanism comprising a load supporting hanger for a trolley conveyor, the said hanger being provided with a trolley adapted to run on a track therefor, and means extending from the hanger and adapted to engage cooperating load supporting devices associated with the trolley track for relieving excessive friction between the conveyor trolley and its track incident to changes in direction of travel of the conveyor.

9. Material handling mechanism comprising a load supporting hanger for a trolley conveyor, the said hanger being provided with a trolley adapted to run on a track therefor, and a flange extending from the hanger and adapted to engage cooperating load supporting devices associated with the trolley track for relieving excessive friction between the conveyor and its track incident to changes in direction of travel of the conveyor.

10. Material handling mechanism comprising the combination with a trolley conveyor, of a track therefor having variations in elevation, the said conveyor including hangers for suspending material handling devices therefrom, guide means associated with the track and disposed in different horizontal planes for guiding the hangers along the track at the changes in elevation of the track, and means on the hangers cooperating with the said guide means and engaging either the upper or lower guide means selectively to support the conveyor along the parts of the track which change in elevation for relieving excessive friction between the conveyor and track incident to such changes in elevation.

11. Material handling mechanism comprising the combination with a trolley conveyor, of a track therefor adapted to extend through many parts of a building on various floors and at various elevations, guide means associated with the track and disposed in upper and lower parallel planes for guiding the hangers along the track at the changes in elevation of the track, and means on the hangers cooperating with the said guide means and engaging either the upper or lower means selectively to support the conveyor along the parts of the track which change in elevation, for relieving friction on the conveyor incident to such changes in elevation.

12. Material handling mechanism comprising the combination with a trolley conveyor, of a track therefor adapted to extend through many parts of a building on various floors and at various elevations, guide devices associated with the track and disposed in upper and lower parallel planes and parallel with the track for guiding the hangers along the track at the changes in elevation of the track, and means on the hangers engaging the upper guide devices and then the lower guide devices as the track changes from lower to higher elevations thereby relieving excessive friction between the conveyor and track incident to such changes in elevation.

13. Material handling mechanism comprising the combination with a trolley conveyor, of a track therefor adapted to extend through many parts of a building on various floors and at various elevations, guide devices associated with the track and disposed in upper and lower parallel planes and parallel with the track for guiding the hangers along the track at the changes in elevation of the track, and means on the hangers engaging the underside of the upper guide devices and then the upper side of the lower guide devices as the track changes from lower to higher elevations, thereby relieving excessive friction between the conveyor and track incident to such changes in elevation.

14. Material handling mechanism comprising the combination with a trolley conveyor, of a track therefor adapted to extend through many parts of a building on various floors and at various elevations, roller guides associated with the track and disposed in rows in upper and lower parallel planes and parallel with the track for guiding the hangers along the track at the changes in elevation of the track, and flanges on the hangers engaging first one and then the other row of the roller guides as the track changes its direction when passing from one horizontal plane to another in changing its elevation.

15. Material handling mechanism comprising a load supporting hanger for a trolley conveyor, the said hanger being provided with a trolley adapted to run on a track therefor, and auxiliary rollers extending from the hanger and adapted to engage cooperating devices associated with the trolley track for supporting at least part of the load on said hanger thereby relieving excessive friction between the conveyor and track incident to changes in direction of travel of the conveyor.

16. Material handling mechanism comprising the combination with an I-beam trolley conveyor, the track therefor having variations in elevation, the conveyor including cooperating trolley wheels for running on the track, and a hanger suspended from the trolley wheels, of means associated with the trolley track and disposed in parallel horizontal planes adjacent changes in elevation of the track and parallel with the track, and means on the hangers engaging the aforesaid means for relieving pressure of the trolley wheels on the I-beam track as the latter changes its elevation.

17. Material handling mechanism comprising the combination with an I-beam trolley conveyor, the track of which includes vertical curves in its course, the conveyor including cooperating trolley wheels for running on the track and hangers suspended from the trolley wheels, of means mounted vertically beneath the track adjacent the curves and disposed in parallel vertical planes and parallel with the track, and means on the hangers engaging the aforesaid means and tending to lift the wheels from engagement with the track as the wheels pass around the curves thereof, thereby relieving wear between the wheels and track as the latter changes its elevation.

18. In a trolley conveyor system, the combination with an endless trolley rail having different elevations along its path, of conveying mechanism associated therewith comprising a continuous draft chain, means for driving said draft chain, load supporting hangers attached to said draft chain and having rollers guided and supported by said trolley rail, and supplemental means for supporting said hangers adjacent positions of said rail where a change of elevation thereof occurs, said supplemental means relieving the load which would otherwise be transferred from said rollers to said trolley rail.

19. In a trolley conveyor system, the combination with an endless trolley rail having different elevations along its path, of conveying mechanism associated therewith comprising a continuous draft chain, means for driving said draft chain, load supporting hangers attached to said draft chain and having rollers guided and supported by said trolley rail, and supplemental means for supporting said hangers adjacent positions of said rail where a change of elevation thereof occurs, said means comprising supplemental load supporting rails and cooperating supplemental load supporting rollers carried by said brackets.

20. In a trolley conveyor system, the combination with an endless trolley rail having different elevations along its path, of conveying mechanism associated therewith comprising a continuous draft chain, means for driving said draft chain, load supporting hangers attached to said draft chain and having rollers guided and supported by said trolley rail, and supplemental means for supporting said hangers adjacent positions of said rail where a change of elevation thereof occurs said means comprising supplemental load supporting rollers and cooperating flanges carried by said brackets.

21. In a trolley conveyor system, the combination with a trolley rail, of a conveyor mechanism associated therewith comprising draft means, driving means for said draft means, load supporting hangers driven by said draft means and having rollers guided and supported by said trolley rail, and supplemental means independent of said rollers for supporting said hangers adjacent portions of the trolley rail where abnormal loads would otherwise be carried by said trolley rail and rollers, said supplemental means being adapted to support a vertical component of the load.

22. In a trolley conveyor system, the combination with a trolley rail, of a conveyor mechanism associated therewith comprising draft means, driving means for said draft means, load supporting hangers driven by said draft means and having rollers guided and supported by said trolley rail, and supplemental means independent of said rollers for supporting a vertical component of the load on said hangers.

23. In a trolley conveyor system, the combination with an endless trolley rail having different elevations along its path, of conveying mechanism associated therewith comprising an endless draft means, driving means for said draft means, load supporting hangers attached to said draft means and having rollers guided and supported by said trolley rail, and supplemental means independent of said rollers for supporting said hangers adjacent positions of said rail where a change of elevation thereof occurs, thereby reducing the load carried by said rollers where a change in elevation occurs.

24. In a trolley conveyor system, the combination with an endless trolley rail having different elevations along its path, of conveying mechanism associated therewith comprising an endless draft means, driving means for said draft means, load supporting hangers attached to said draft means and having rollers guided and supported by said trolley rail, and supplemental means for supporting said hangers adjacent positions of said rail where a change of elevation thereof occurs said means comprising supplemental load supporting rails and cooperating supplemental load supporting rollers carried by said brackets.

25. In a trolley conveyor system, the combination with an endless trolley rail having different elevations along its path, of conveying mechanism associated therewith comprising an endless draft means, driving means for said draft means, load supporting hangers attached to said draft means and having rollers guided and supported by said trolley rail, and supplemental means for supporting said hangers adjacent positions of said rail where a change of elevation thereof occurs said means comprising supplemental load supporting rollers and cooperating flanges carried by said brackets.

26. In material handling mechanism, the combination with a trolley conveyor including trolley wheels and hangers suspended therefrom, of a main I-beam track including vertical curves to provide variations in elevation, an auxiliary track located adjacent the main track and at changes in elevation of said main track, the auxiliary track being provided with vertically disposed guide devices, and means on the trolley hangers for engaging said guide devices when the trolley track is changing its elevation to relieve the pressure of the trolley wheels on the main track.

27. In material handling mechanism, the combination with a trolley conveyor comprising oppositely disposed trolley wheels and a plurality of spaced-apart hangers suspended from the trolley wheels, of a main track including an I-beam along which the said wheels run, an auxiliary track associated with a vertically curved portion of said main track, and co-operating means on the auxiliary track and on said hangers tending to lift the said wheels from engagement with the main track as the trolley travels along the curved portion of the said main track, thereby relieving excessive wear between the trolley wheels and track as the conveyor travels around the curved portion of the track.

28. In material handling mechanism, the combination with a trolley conveyor comprising a plurality of spaced-apart hangers, of a track, parallel vertically disposed guides adjacent vertical curved portions of said track, and laterally projecting means on said hangers for engaging said guides and supported thereby as the trolley travels around such curved portions of the main track for relieving friction between the conveyor and track.

29. In material handling mechanism, the combination with a trolley conveyor comprising oppositely disposed trolley wheels, a plurality of hangers suspended from the wheels, of a main track for the trolley wheels, an auxiliary track parallel with the main track comprising a series of vertically disposed parallel transverse anti-friction rollers, and laterally projecting plates on said hangers in position to engage said rollers when the trolley travels along curved portions of said main track.

30. In material handling mechanism, the combination with a trolley conveyer having roller supported hangers and a connecting draft chain, of a track therefor having a curved portion in an upright plane and being so curved that the pull on said chain tends to increase the pressure of said roller on said track, and means for relieving the pressure on said track along said curved portion due to said pull on said trolley conveyor draft chain.

31. In material handling mechanism, the combination with a trolley conveyor having roller supported hangers and connecting draft means, of a track therefor having a curved portion in an upright plane, and being so curved that a pull on said draft means tends to increase the thrust on said curved track portion, and means associated with said curved portion for receiving a portion of the thrust toward the center of said curve due to the pulling thrust during operation of said trolley conveyor.

DANIEL KNIES.